United States Patent [19]
Sawyer et al.

[11] 3,881,301
[45] May 6, 1975

[54] CROP HARVESTING MACHINE

[75] Inventors: Bobby Gene Sawyer, Ottumwa, Iowa; Donald E. Burrough, West Bend, Wis.

[73] Assignee: Deere & Company, Moline, Ill.

[22] Filed: July 3, 1972

[21] Appl. No.: 268,562

[52] U.S. Cl............................ 56/14.4; 56/192
[51] Int. Cl............................................. A01d 45/02
[58] Field of Search ...... 56/DIG. 1, 189, 14.4, 16.4, 56/192, 370, 371, 367; 176/101

[56] References Cited
UNITED STATES PATENTS

| | | | |
|---|---|---|---|
| 3,343,848 | 9/1967 | Dorschner .................. | 56/DIG. 1 X |
| 3,383,844 | 5/1968 | Glass et al. ................. | 56/DIG. 1 X |
| 3,550,363 | 12/1970 | Halls et al. ................. | 56/DIG. 1 |
| 3,555,791 | 1/1971 | McCarty et al. ............ | 56/DIG. 1 X |
| 3,596,717 | 8/1971 | Knudsen .................... | 171/101 |
| 3,656,284 | 4/1972 | Meek et al. ................. | 56/DIG. 1 |
| 3,672,135 | 6/1972 | Peacock et al. ............ | 56/DIG. 1 X |
| 3,680,290 | 8/1972 | Laverne ..................... | 56/192 X |
| 3,722,191 | 3/1973 | Braunberger ............... | 56/DIG. 1 |

*Primary Examiner*—Russell R. Kinsey

[57] ABSTRACT

A crop harvesting machine having a mobile main frame with a header subframe suspended therefrom, the subframe having a transverse cutter bar mounted forwardly thereon for cutting a swath of crop material as the machine is advanced forwardly through a field, an upper and lower pair of crop conditioning rolls for conditioning the crop cut by the cutter bar and discharging it along a curved path extending rearwardly from the rolls in vertical spaced relation to the ground and thence downwardly to the ground, and a reel for directing standing crop into the cutter bar and transferring the swath of cut crop material from the cutter bar to the conditioning rolls. A pair of transversely spaced wheels support the main frame relative to the ground, the wheels being disposed rearwardly of and within the transverse extent of said conditioning rolls, and directly below and forwardly of the path of crop material discharged from the rolls, whereby in operation of the machine, crop material is discharged from the rolls directly over the wheels and thence to the ground at a point rearwardly thereof.

14 Claims, 6 Drawing Figures

CROP HARVESTING MACHINE

BACKGROUND OF THE INVENTION

The present invention relates generally to crop harvesting machines and more particularly to a novel ground wheel mounting for a machine of the mower-conditioner type.

A conventional pull-type mower-conditioner includes an L-shaped main frame adapted at its forward end for attachment to the drawbar of a tractor and having a transversely spaced pair of ground-engaging wheels mounted on its transverse rear portion and adapted to support the frame for movement through a field. Suspended from the transverse frame portion is a subframe or header having a transverse cutter bar disposed along its lower leading edge and adapted to cut a swath of crop material as the machine is advanced forwardly, an upper and lower pair of crop conditioning rolls mounted upward and rearwardly from the cutter bar, the conditioning rolls being operative to condition the stems of the cut crop material and discharge the crop along a curved path extending rearwardly from the rolls and thence downwardly to the ground, and a harvesting reel for directing the standing crop into the cutter bar and transferring the cut crop upwardly and rearwardly from the cutter bar to the conditioning rolls. Adjustable deflector means are included at the rear of the header for selectively deflecting the swath of crop material discharged from the conditioning rolls either into a relatively wide swath or a relatively narrow windrow.

Since the right side of the machine, during the harvesting operation, divides the crop being harvested from the crop left standing, it is necessary and has been the universal practice to locate the right ground wheel within the transverse extent of the cutter bar and conditioning rolls so that the wheel rides on the crop stubble left by the cutter bar rather than on the standing crop. It has been considered necessary in the past to locate this wheel outwardly from the path of the crop material discharged from the rolls and consequently at a substantial distance rearwardly of the cutter bar, to prevent the crop from hitting the wheel when it is discharged rearwardly.

Several disadvantages result from this conventional wheel placement. Since the wheel serves as the primary height gauging means for the cutter bar, its location at a substantial distance rearwardly therefrom results in generally poor gauging of the cutter bar height. In addition, the placement of the right wheel at a substantial distance rearwardly from the cutter bar and conditioning rolls, and thus from the center of gravity of the machine, has a tendency to transfer a greater portion of the machine weight to the right wheel than to the left. As a result, the machine has a greater tendency to fall back or skew as it is towed, and to handle especially poorly on hillsides and in turns. One attempted solution to the latter problem has been to position the ground wheels at an angle rather than straight ahead, to counteract the tendency of the machine to fall back.

SUMMARY OF THE INVENTION

It is, accordingly, an object of the present invention to provide a crop harvesting machine of the mower-conditioner type haaving substantially improved cutter bar gauging characteristics.

It is another object to provide such a machine having improved weight distribution to the ground wheels and thus improved towing characteristics.

It is yet another object of the invention to provide such a machine in which the ground-engaging wheels supporting the main frame and serving as the primary gauge means for the cutter bar are positioned substantially closer to the cutter bar than was heretofore considered possible without interferring with the crop discharged from the conditioning rolls.

These and other objects are achieved, according to the invention, by positioning the ground wheels which support the main frame directly beneath the path of crop material discharged from the conditioning rolls. In order to avoid interference between the wheels and the crop, the wheels utilized in the preferred embodiment have a diameter substantially less than wheels of conventional size. During the harvesting operation, the conditioned swath of crop material is thus discharged rearwardly directly over the ground wheels and thence downwardly to the ground at a point rearwardly of the wheels. Due to their proximity to the cutter bar, ground wheels positioned in accordance with the invention perform their cutter bar gauging function in a manner substantially better than conventionally positioned wheels. In addition, since the wheels are located much closer to the center of gravity of the machine, more machine weight is supported by the left wheel than is the case with conventionally positioned wheels, with the resulting benefit of improved towing and handling characteristics.

BRIEF DESCRIPTION OF THE DRAWINGS

The preferred embodiment of the present invention will be described in conjunction with the accompanying drawings in which.

Flg. 2 is a side elevational view similar to FIG. 1 but showing the machine in its lower, operating position.

DESCRIPTION OF THE PREFERRED EMBODIMENT

In the ensuing description, right- and left-hand reference is determined by facing the direction of travel of the machine.

Figure 5:
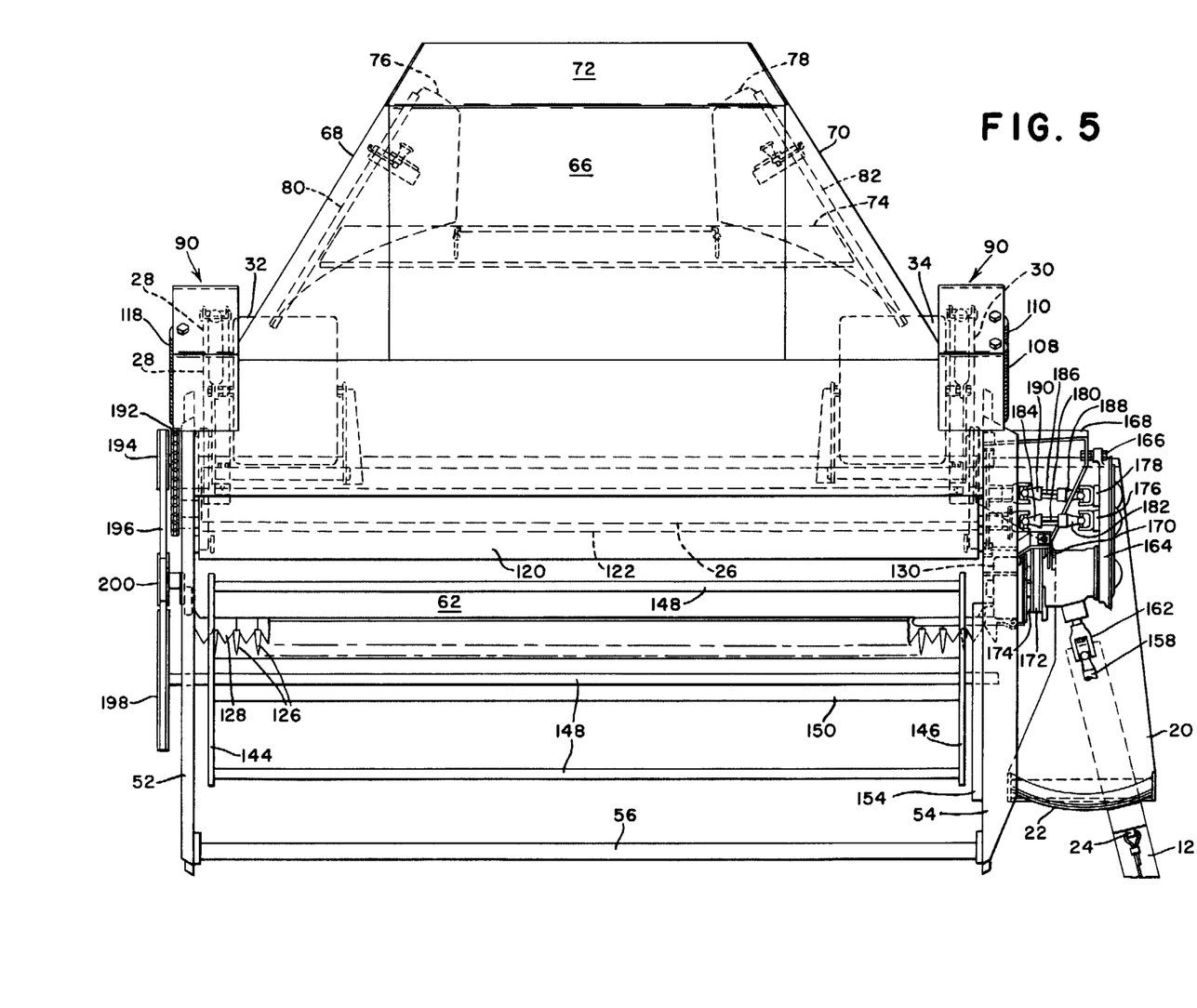
FIG. 5 is a plan view of the machine on the same scale as FIGS. 1 and 2.

Referring now to the drawings, the preferred embodiment of the invention includes a generally L-shaped main frame structure 10 comprised of a longitudinal draft portion on the left side of the machine and a transverse portion connected at its left end to the rear of the draft portion. The longitudinal portion consists of a tongue member 12 adapted at its forward end for attachment to the drawbar 14 of an agricultural tractor shown partially at 16, and pivotally mounted at its rear end by means of a generally vertical pin 18 between the upper and lower sides of a box frame section 20. The section 20 has an arcuate leading edge member 22 provided with a plurality of spaced apertures into which a pin 24 carried by the tongue 12 is releasably positionable to secure the tongue 12 in various angular positions of adjustment relative to the section 20. In FIG. 5, the tongue 12 is illustrated in its extreme left position. To narrow the tractor-machine combination for transport purposes, the tongue would be swung to and secured in it extreme right position.

Figure 1:
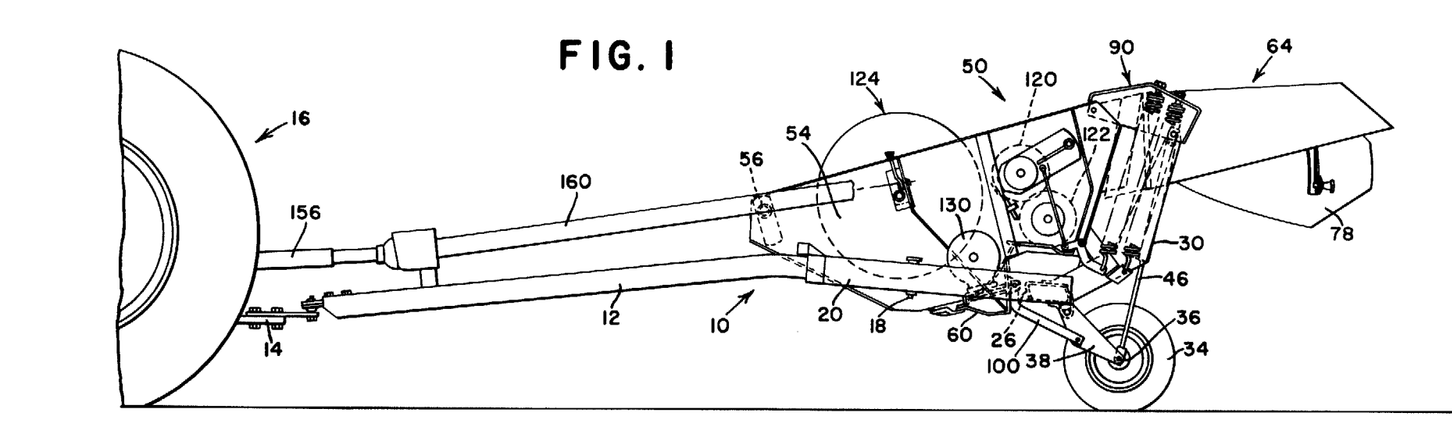
FIG. 1 is a somewhat schematic, side elevational view of a crop harvesting machine constructed in accordance with the principles of the invention, showing the machine in its raised, transport position.
Figure 2:
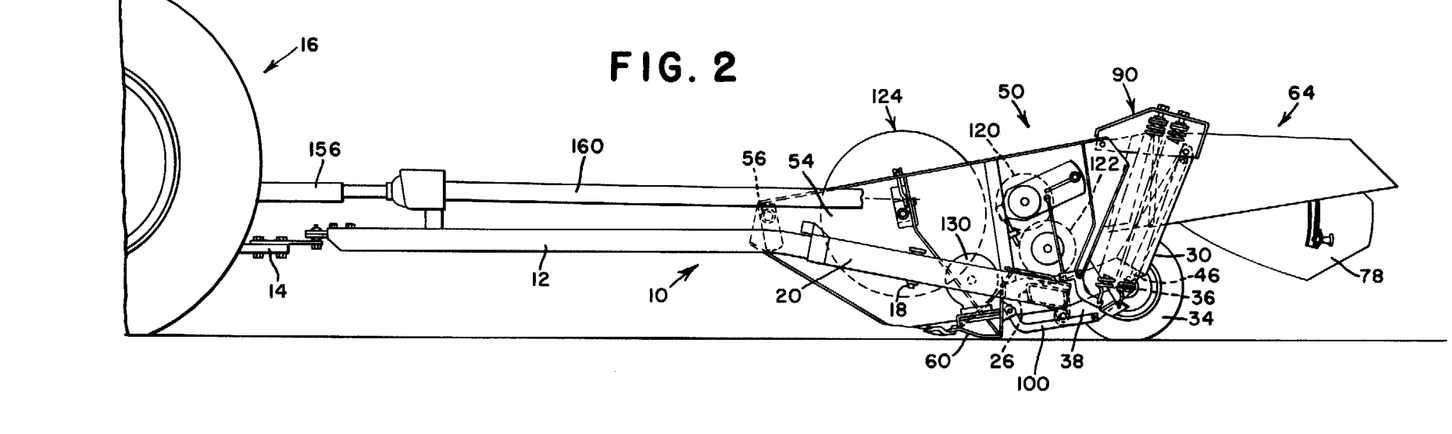

Fixed at its left end to the right rear portion of the section 20 is a transverse beam 26 having a transversely spaced pair of upwardly and rearwardly extending members 28 and 30 fixed to its right and left ends, respectively. A right and left pair of relatively wide, small diameter wheels 32 and 34, respectively, support the main frame structure relative to the ground, the wheels 32 and 34 being mounted on the transverse beam 26 just inwardly of the members 28 and 30, respectively. Each wheel is rotatably supported on a transverse axle 36 extending between the rear ends of an outer wheel supporting arm 38 and an inner wheel supporting arm 40, the arms 38 and 40 being interconnected at their forward ends by means of a tubular member 42 which is rotatably received in a bracket 44 fixed to the lower rear corner of the transverse beam 26. The members 28 and 30 which extend upwardly and rearwardly from the transverse frame member just outwardly of the wheels 32 and 34, respectively, are each composed of a rearwardly opening, U-shaped channel, and disposed between the walls of each member is an extensible and retractable hydraulic cylinder 46 for raising and lowering the wheels relative to the frame and thereby raising and lowering the frame relative to the ground. The upper end of each cylinder 46 is pivotally connected at 48 between the walls of its respective frame member, and the lower end thereof is pivotally connected to the extreme outer end of the adjacent wheel axle 36. FIG. 1 illustrates the hydraulic cylinders 46 in their extended positions and the machine in its raised transport position, while FIG. 2 illustrates the hydraulic cylinders in their retracted positions and the machine in its lowered operating position. The cylinders 46 are connected by conventional means (not shown) with a hydraulic fluid source on the tractor to extend and retract at the same rate of speed, so that the machine is maintained in a transversely level condition as it is raised and lowered.

Suspended from the transverse portion of the main frame 10 is a subframe or header 50 which carries the various harvesting elements of the machine. The header is formed of right and left side panels 52 and 54, respectively, interconnected at their forward ends by a transverse crop-engaging bar 56, at their upper rear ends by means of a transverse upper beam member 58, and at their lower center portions by a transverse lower beam member 60 and a transverse arcuate ramp 62. Fixed to and extending rearwardly from the side panels 52 and 54 and the upper beam 58 is a downwardly opening crop deflector hood structure designed generally by the numeral 64 and formed by a generally horizontal top wall 66, a right and left pair of rearwardly converging, generally vertical side walls 68 and 70, respectively, fixed to and extending downwardly from opposite sides of the top wall 66, and a downwardly and rearwardly inclined rear wall 72 interconnecting the rear edges of the top wall 66 and side walls 68 and 70. As is apparent from the drawings, the hood structure 64 is positioned in overlying relation to the ground wheels 32 and 34, the latter being located directly beneath the top wall 66 and between the side walls 68 and 70.

Figure 3:
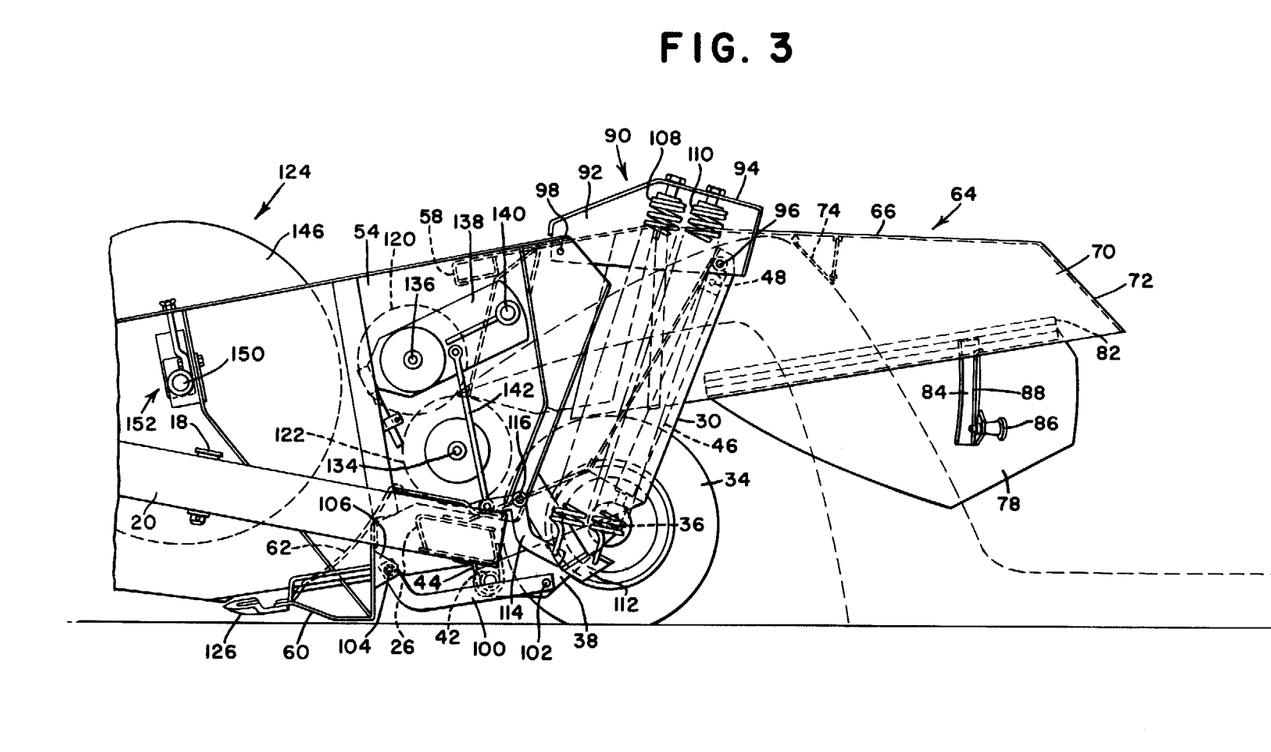
FIG. 3 is an enlarged, fragmentary side elevational view of the machine with portions removed for the sake of clarity, showing the path of the crop material over the ground wheels when the deflector means of the machine is adjusted for laying a relatively wide swath.
Figure 4:
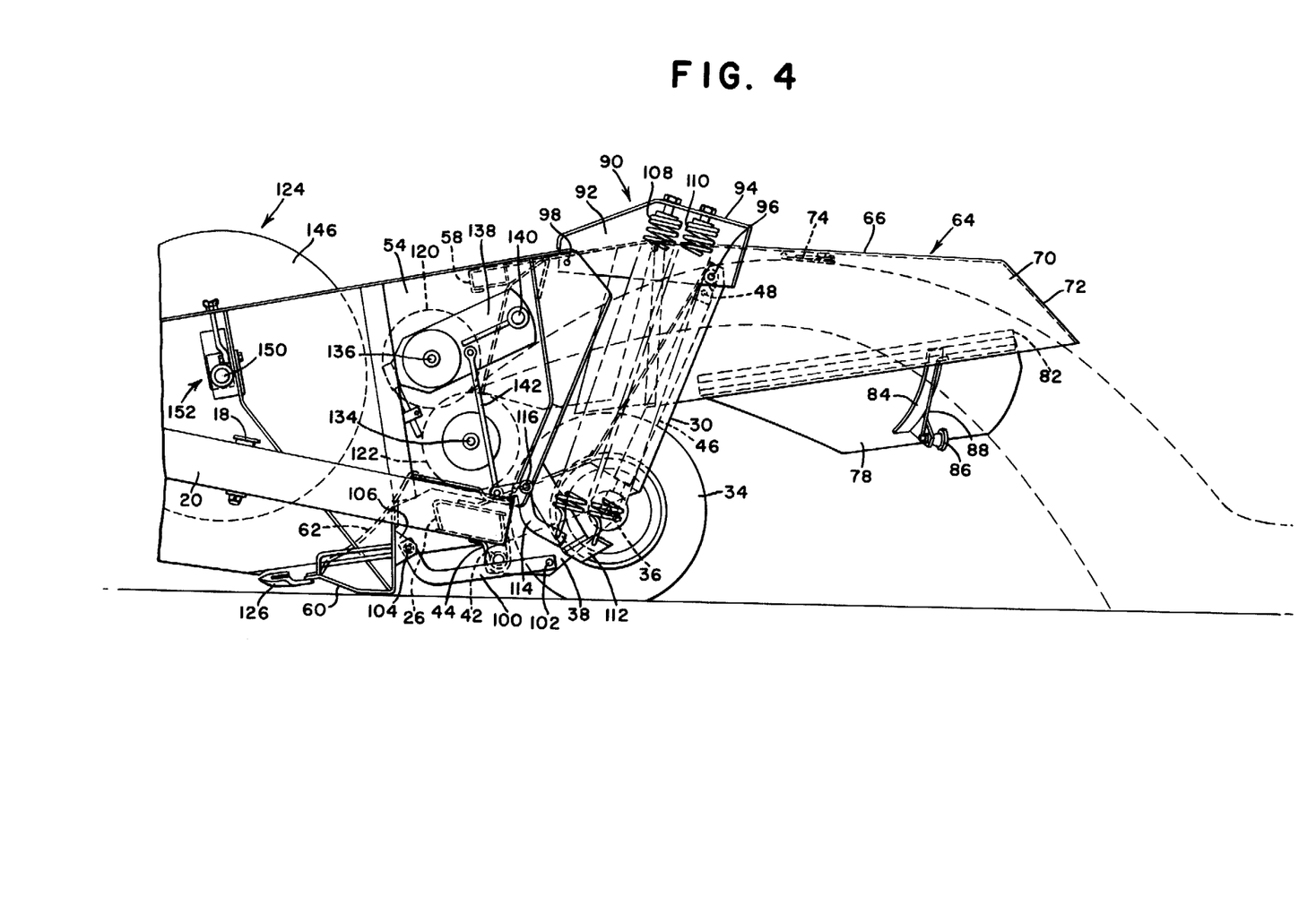
FIG. 4 is a side elevational view similar to FIG. 3 but showing the path of the crop material over the ground wheels when the deflector means is adjusted for laying a relatively narrow windrow.

Hingedly secured to the underneath side of the top wall 66 rearwardly of the wheels 32 and 34 is a transversely extending top deflector member 74, the member 74 being supported for vertical swinging movement between a downwardly and rearwardly inclined swath-forming position shown in FIG. 3, and a generally horizontal windrow-forming position shown in FIG. 4. As will become apparent hereinafter, the deflector member 74, in the former position, is disposed in the path of the harvested crop flow and is thus operative to deflect the crop abruptly downwardly toward the ground. In the latter position, the member 74 is swung away from the path of crop flow, thereby permitting the crop to pass unobstructed out the rear of the hood structure 64. Hingedly secured to the hood structure side walls 68 and 70 are a pair of curved, side deflector members or wings 76 and 78, respectively, the wings being mounted to the side walls by means of hinge members 80 and 82 which have converging axes extending rearwardly, inwardly and upwardly. A bracket 84 on each of the wings supports a threaded adjusting knob 86 which is apertured to receive a rod 88 swingably supported at its upper end on each of the side walls of the hood structure 64. The knob 86 may be loosened to permit the rod 88 to pass freely through the aperture therein, or it may be tightened against the rod to prevent such movement and thereby retain the wing in a fixed position. When arranged to form the harvested crop in a swath, the wings 76 and 78 are secured in their lowered swath-forming positions shown in FIGS. 1-3, so that the crop deflected downwardly by the top deflector member 74 is not converged by the wings. When arranged instead to form the harvested crop in a windrow, the wings are secured in their raised, windrow-forming positions shown in FIGS. 4-6. In this position, the wings are disposed in the path of crop flow and are operative to engage and deflect the crop inwardly into a relatively narrow windrow. The position of the wings may be adjusted as desired by means of the adjusting knobs 86 to vary the width of the windrow formed.

The subframe or header 50 is suspended from the transverse portion of the main frame 10 by means of a mechanism which permits the header to "float" relative to the main frame and thereby closely follow the contour of the ground and raise to clear obstructions which are encountered. This mechanism, which is the subject of copending application Ser. No. 268,976, comprises, generally, upper and lower pairs of transversely spaced links which interconnect the header 50 and main frame 10, and tension spring means acting between the upper pair of links and the header. More specifically, the mechanism includes a pair of mirror image upper link members 90 formed of identical inner and outer, transversely spaced vertical plates 92 interconnected along their upper and rear edges by means of a transverse plate 94, the latter including a portion substantially overhanging the outer plate 92. The rear portions of the vertical plates 92 of the left link 90 extend on opposite sides of the upper end of the member 30 which is fixed to and extends upwardly and rearwardly from the transverse beam 26. A pin 96 extends through aligned apertures in the plates 92 and member 30 to pivotally connect the left link 90 to the main frame. In like manner, the vertical plates 92 of the right link 90 extend on opposite sides of the upper end of the member 28 and are pivotally connected thereto. The forward portions of the plates 92 of the left link 90 are pinned at 98 to the left side panel 54 of the header 50, and, similarly, the forward portions of the plates 92 of the right link 90 are pinned to the right side panel 52 of the header. The suspension mechanism further includes a pair of lower link members 100, the rear ends of which are pivotally connected at 102 to the center portion of the outer wheel arms 38, and the front ends of which are pivotally connected at 104 to brackets 106 fixed to the rear wall of the transverse header beam 60.

A pair of fore-and-aft float springs 108 and 110, respectively, act between the left upper link 90 and the header to resiliently support the left side of the header relative to the main frame, the springs being anchored at their upper ends to the overhanging portion of the transverse plate 94. The lower end of the rear spring 110 is anchored to a bracket 112 whcih is fixed to and extends rearwardly from the left side panel 54 of the header, while the lower end of the front spring 108 is anchored to one arm of a bell crank 114 pivotally mounted at 116 on the side panel 54. As will subsequently appear, the spring 108 acts through the bell crank 114 to provide a biasing force for the crop conditioning rolls on the header. Since the weight of the right side of the header 50 is somewhat less than that of the left side, only a single float spring 118 is employed to support this side of the header. The spring 118 is anchored at its upper end to the overhanging portion of the plate 94 of the right link 90 and at its lower end to a bell crank 114 pivotally mounted on the right header side panel 52.

It will be apparent that, with the machine in its lowered, operating position as shown in FIGS. 3 and 4, the upper and lower links of the suspension mechanism act as parallel link means to maintain the header in a constant orientation relative to the ground as it floats to follow the ground contour. When the machine is raised to its transport position of FIG. 1, however, the lower links 100 are no longer parallel to the upper links 90, since the pins 102 connecting the rear ends of the links 100 to the wheel arm 38 are moved downwardly and forwardly relative to the main frame. Still referring to FIG. 1, it will be seen that when the machine is raised the leading edges of the lower links 100 contact the rear wall of the header transverse beam 60, thereby acting as stop members to limit the upward flotation of the header for transport purposes, and thus to increase the transport stability of the machine.

The harvesting components carried by the header include a conventional, reciprocating-type mowing apparatus extending transversely across the front side of the lower transverse beam 60, the apparatus being operative to mow a swath of crop material as the machine is advanced forwardly through a field; an upper and lower pair of intermeshing crop conditioning rolls 120 and 122, respectively, the rolls being operative to condition the mowed crop by cracking the stems thereof to facilitate the escape of moisture; and a conventional, retractable finger-type reel 124 mounted above the mowing apparatus and forwardly of the conditioning rolls to direct standing crop into the mower and advance the mowed crop up the arcuate ramp 62 from the mower to the conditioning rolls. The mowing apparatus is of a type well known in the art and comprises a plurality of transversely spaced guards 126 mounted along the front side of the beam 60, and an elongated sickle bar 128 reciprocable transversely through slots formed in the guards. Reciprocating motion is produced for driving the sickle bar by means of a conventional wobble drive mechanism contained within a housing 130 mounted on the extreme left end of the beam 60, the mechanism having a rotary input shaft with a drive sheave 132 mounted thereon.

Figure 6:
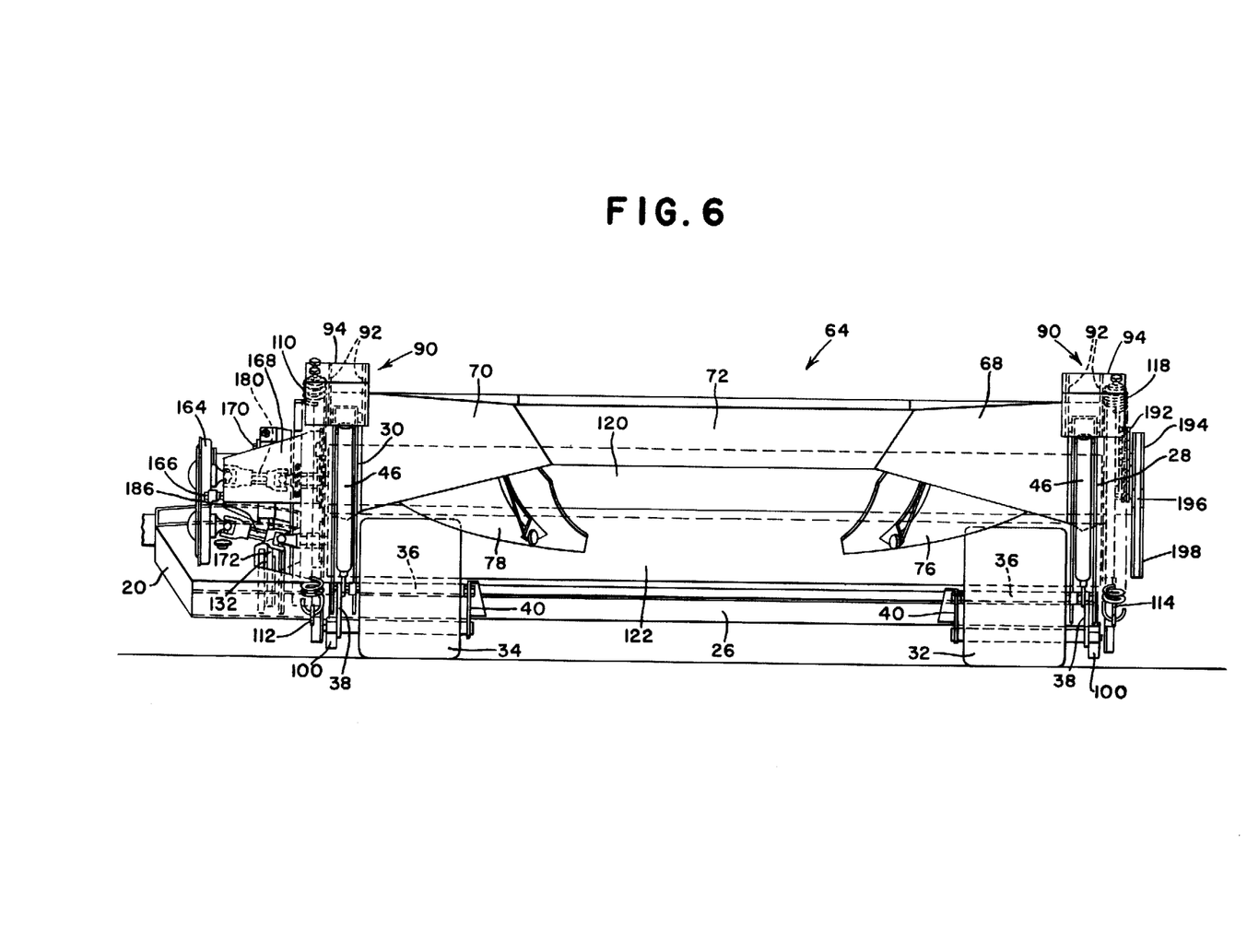
FIG. 6 is a rear elevational view of the machine on the same scale as FIG. 5.

As is clear from FIGS. 5 and 6 of the drawings, the crop conditioning rolls 120 and 122 extend the full width of the header 50, between the side panels 52 and 54. It is further clear from these figures of the drawings that the ground wheels 32 anad 34 are mounted primarily rearwardly of and within the transverse extent of the rolls. As shown in FIGS. 1-4 of the drawings, however, the extreme forward portions of the wheels 32 and 34 actually extend beneath the rear portion of the lower roll 122. The lower crop conditioning roll 122 is supported on a shaft 134 which, in turn, is rotatably mounted at opposite ends on the header side panels 52 and 54. The upper roll 120 is supported on a shaft 136, the shaft 136 being supported at its ends on parallel arms 138 pivoted at 140 to the header side panels. It will be seen that the mounting for the upper roll permits the latter to move toward and away from the fixed position lower roll, along an arcuate path about the pivot 140. As previously indicated, a downward biasing force is exerted on the ends of the upper roll by means of the float springs 108 and 118, each of which is anchored at its lower end to one of the arms of a bell crank 114. The other arm of each of the bell cranks is connected by means of a vertical connecting link 142 to one of the parallel arms 138 supporting the upper roll shaft 136. It will thus be apparent that the springs 108 and 118 serve the dual function of providing flotation for the header while simultaneously biasing the upper roll against the lower roll. Should a rock or other object be introduced between the rolls along with the crop material, the springs will stretch to allow the upper roll to move away from the lower roll a distance sufficient to pass the object without damaging the rolls or their supporting structure.

The reel 124, shown only schematically in the drawings, is also of conventional design and includes a pair of circular end panels 144 and 146 interconnected by a plurality of transverse pipe members 148. A control shaft 150 also interconnects the end panels 144 and 146 and is rotatably supported at its ends in the header end panels 52 and 54. An adjusting mechanism indicated generally by the numeral 152 is provided on the end panels at each end of the shaft 150 to permit adjustment of the reel height relative to the mowing apparatus. Conventionally, the reel pipe members 148 have a series of fingers mounted thereon which extend and retract as the reel rotates. The action of the fingers is controlled by a cam 154 mounted on the inner wall of the left side panel 52, the cam being engaged by cam followers (not shown), one of which is provided for the set of fingers mounted on each of the reel pipe members 148.

Power for driving the harvesting components on the header is supplied by the power take-off shaft on the rear of the tractor 16. A short, telescoping shaft 156 connects the tractor power take-off shaft to the front end of a main, longitudinal drive shaft 158 concealed in FIGs. 1 and 2 of the drawings by a shield 160. The rear end of the shaft 158 is connected by a universal joint 162 to the input shaft of a gear case 164 mounted on the outer side of the left header side panel 52. The harvesting component drive apparatus, including the manner in which the gear case 164 is mounted on the header side panel 52, is the subject of copending application Ser. No. 266,210. The rear portion of the gear case 164 is pivotally connected by means of a bolt 166 to a bracket 168 fixed to the panel 52. An additional pair of bolts 170, only one of which is visible in the drawings, secures the forward portion of the gear case 164 to the bracket 168, the bolts 170 being received in arcuate slots in the bracket 168 so that the gear case can be swung about the bolt 166 to various positions of adjustment when the bolts 170 are loosened. The gear case adjustment provided in this manner is for the purpose of maintaining proper tension in a belt 172 which drivingly connects an output sheave 174 on the front portion of the gear case with the sheave 132 on the input shaft of the wobble drive mechanism for the mowing apparatus. When the tension in this belt has decreased as a result of wear, the gear case can be adjusted upwardly to restore proper tension therein.

The gear case 164 further includes a pair of oppositely rotating output shafts 176 and 178 for driving the upper and lower conditioning rolls, respectively. A short, telescoping power shaft 180 is connected at its outer end through a universal joint 182 to the gear case output shaft 176 and at its inner end through a universal joint 184 to the upper roll shaft 136. A second telescoping power shaft 186 is connected at its outer end through a universal joint 188 to the gear case output shaft 178 and at its inner end through a universal joint 190 to the lower roll shaft 134. The flexible connections between the gear case output shafts 176 and 178 and the conditioning roll shafts 136 and 134, respectively, provide for misalignment between these shafts which occurs, in the case of both sets of shafts, as the position of the gear case is changed to tension the mowing apparatus drive belt 172, and, in the case of the upper set of shafts, when the upper roll moves away from the lower roll to pass an obstruction between the rolls.

The reel 124 is driven from the right side of the upper conditioning roll shaft 136. A chain 192 drivingly connects a first sprocket on the extreme right end of the upper roll shaft 135 with a second sprocket on a jackshaft aligned with the upper roll support arm pivot 140. Also mounted on and rotatable with this jackshaft is a sheave 194 which is drivingly connected by means of a belt 196 to a sheave 198 on the right end of the reel shaft 150. An idler sheave 200 acts to maintain proper tension in the reel drive belt 196.

The operation of the machine will now be described. As the machine is towed forwardly over a field of crop material, the rotating reel 124 directs the standing crop rearwardly into the mowing apparatus, the latter being operative to cut a swath of crop material. The reel continues to feed the cut crop upwardly and rearwardly along the arcuate ramp 62 to the crop conditioning rolls 120 and 122. As the crop passes between the rolls, the stems are crushed to facilitate the escape of moisture therefrom and thus speed the drying process, and the swath is then discharged along a curved path extending upwardly and rearwardly from the rolls in spaced relation to the ground. Due to the relative position of the rolls 120 and 122 and the ground wheels 32 and 34, the crop is discharged from the rolls directly over the wheels, as is clear from FIGS. 3 and 4 of the drawings. As previously described, FIG. 3 illustrates the deflector means of the invention arranged to form the crop in a relatively wide swath. The top deflector member 74 is arranged in its lowered, swath-forming position and the side deflector wings 76 and 78 are similarly arranged in their lowered, swath-forming positions. FIG. 4, as also previously described, illustrates the deflector means arranged to form the crop in a relatively narrow windrow. The top deflector member in this case is raised out of the path of the crop material, and the side deflector wings are raised to engage the crop and deflect it inwardly into a windrow. In both cases it will be seen that the unconventionally small diameter of the wheels 32 and 34 permits the crop to pass directly over the wheels without interferring therewith.

We claim:

1. A crop harvesting machine comprising: transversely extending frame means adapted to advance forwardly through a field; transversely extending cutting means mounted forwardly on said frame means and adapted to cut a swath of crop material as said frame means is advanced forwardly; a generally fore-and-aft draft member extending forwardly from one side of the frame means along one lateral side of the cutting means; an upper and lower pair of parallel, transversely extending crop conditioning rolls mounted on said frame means above and rearwardly of said cutting means; crop transfer means for transferring cut crop material from said cutting means to said crop conditioning rolls, said rolls being operative to receive crop material therebetween and discharge said crop material rearwardly, the momentum of the crop carrying it along an air borne path extending rearwardly from said rolls in spaced relation to the ground and thence downwardly to the ground; and a transversely spaced pair of ground-engaging wheels connected to said frame means and operative to support said frame means relative to the ground, at least one of said wheels being disposed rearwardly of and within the transverse extent of said conditioning rolls, and directly below and forwardly of the air borne path of crop material discharged from said rolls, whereby in operation of said crop harvesting machine crop material is discharged from said rolls directly over said one wheel and thence downwardly to the ground rearwardly of said one wheel.

2. The invention defined in claim 1 wherein said crop conditioning rolls include right and left end portions, and wherein both of the wheels are rearwardly of and within the transverse extent of said rolls, one of said wheels being disposed directly rearwardly of the right end portion of said rolls and the other of said wheels being disposed directly rearwardly of the left end portion of said rolls, both of said wheels being disposed directly below and forwardly of the path of crop material discharged from said rolls, whereby in operation of said crop harvesting machine crop material is discharged from said rolls directly over both of said wheels and thence downwardly to the ground rearwardly of both of said wheels.

3. The invention defined in claim 1 wherein said one wheel means includes a forward portion that extends directly beneath the lower of said crop conditioning rolls.

4. The invention defined in claim 1 including a pair of rearwardly converging, vertically extending crop deflector panels connected to the frame means and having forward end portions disposed rearwardly of and in general fore-and-aft alignment with opposite ends of said crop conditioning rolls, at least a portion of said one wheel being disposed inwardly of the forward end portion of one of the side panels.

5. The invention defined in claim 1 including a transversely extending deflector member mounted on said frame means and selectively swingable downwardly into the path of crop material discharged from said conditioning rolls to deflect said crop material abruptly downwardly toward the ground, said one wheel being disposed forwardly of said deflector member and forwardly of the path of the crop material deflected downwardly thereby.

6. The invention defined in claim 1 including a hood portion connected to the frame means and extending rearwardly therefrom in overlying spaced relation to the path of crop material discharged from said crop conditioning rolls, said hood portion having a pair of rearwardly converging, vertically extending side walls having forward end portions disposed rearwardly of and in general fore-and-aft alignment with opposite ends of said rolls, said one wheel being disposed directly beneath said hood portion and between said side walls.

7. The invention defined in claim 6 including a transversely extending top deflector member mounted on said hood portion for swinging movement between a lowered, swath-forming position wherein said top deflector member is disposed in the path of crop material discharged from said conditioning rolls and is operable to deflect said crop material abruptly downwardly toward the ground, and a raised, windrow-forming position wherein said top deflector member is swung away from the path of crop material, said one wheel being disposed forwardly of said top deflector member and forwardly of the path of the crop material deflected downwardly thereby, and further including a pair of adjustable side deflector members, one of said side deflector members being hingedly connected to each of said side panels for swinging movement about an axis extending rearwardly, inwardly and upwardly between a lowered, swath-forming position and a raised, windrow-forming position in the path of said crop material discharged from said conditioning rolls, said side deflector members when in their lowered position permitting said crop material deflected downwardly by said top deflector member to fall to the ground in a relatively wide swath, and said side deflector members when in their raised positions being operative to deflect the crop material inwardly into a relatively narrow windrow.

8. A crop harvesting machine comprising: transversely extending frame means adapted to advance forwardly through a field; transversely extending cutting means mounted forwardly on said frame means and adapted to cut a swath of crop material as said frame means is advanced forwardly; an upper and lower pair of parallel, transversely extending crop conditioning rolls mounted on said frame means above and rearwardly of said cutting means; crop transfer means for transferring cut crop material from said cutting means to said crop conditioning rolls, said rolls being operative to receive crop material therebetween and discharge said crop material rearwardly, the momentum of the crop carrying it along an air borne path extending rearwardly from said rolls in spaced relation to the ground and thence downwardly to the ground; and at least one ground-engaging wheel connected to said frame means and operative to support said frame means relative to the ground, a substantial portion of said wheel being disposed rearwardly of and within the transverse extent of said conditioning rolls, and directly below and forwardly of the air borne path of crop material discharged from said rolls, whereby in operation of said crop harvesting machine crop material is discharged from said rolls directly over said substantial portion of said wheel and thence downwardly to the ground rearwardly of said wheel.

9. The invention defined in claim 8 wherein said substantial portion of said wheel includes the fore-and-aft center of said wheel.

10. A crop harvesting machine comprising: transversely extending frame means adapted to advance forwardly through a field; transversely extending cutting means mounted forwardly on said frame means and adapted to cut a swath of crop material as said frame means is advanced forwardly; an upper and lower pair of parallel, transversely extending crop conditioning rolls mounted on said frame means above and rearwardly of said cutting means; crop transfer means for transferring cut crop material from said cutting means to said crop conditioning rolls, said rolls being operative to receive crop material therebetween and discharge said crop material along a path extending rearwardly from said rolls in spaced relation to the ground and thence downwardly to the ground; a transversely spaced pair of ground-engaging wheels connected to said frame means and operative to support said frame means relative to the ground; a hood portion connected to the frame means and extending rearwardly therefrom in overlying spaced relation to the path of crop material discharged from said crop conditioning rolls, said hood portion having a pair of rearwardly converging, vertically extending side walls having forward end portions disposed rearwardly of and in general fore-and-aft alignment with opposite ends of said rolls; a transversely extending top deflector member mounted on said hood portion for swinging movement between a lowered, swath-forming position wherein said top deflector member is disposed in the path of crop material discharged from said conditioning rolls and is operative to deflect said crop material abruptly downwardly toward the ground, and a raised, windrow-forming position wherein said top deflector member is swung away from the path of crop material; and a pair of adjustable side deflector members, one of said side deflector members being hingedly connected to each of said side walls for swinging movement about an axis extending rearwardly, inwardly and upwardly between a lowered, swath-forming position and a raised, windrow-forming position in the path of said crop material discharged from said conditioning rolls, said side deflector members when in their lowered positions permitting said crop material deflected downwardly by said top deflector member to fall to the ground in a relatively wide swath, and said side deflector members when in their raised positions being operative to deflect crop material inwardly into a relatively narrow windrow.

11. The invention defined in claim 10 wherein at least one of said wheels is disposed rearwardly of and within the transverse extent of said conditioning rolls, directly below and forwardly of the path of the crop material discharged from said rolls, whereby in operation of said crop harvesting machine crop material is discharged from said rolls directly over said one wheel and thence downwardly to the ground rearwardly of said one wheel.

12. A crop harvesting machine comprising: transversely extending frame means adapted to advance forwardly through a field; transversely extending cutting means mounted forwardly on said frame means and adapted to cut a swath of crop material as said frame means is advanaced forwardly; cooperating upper and lower parallel, transversely extending crop conditioning rolls mounted on said frame means above and rearwardly of said cutting means and in material-receiving relation to said cutting means, said lower roll being rearwardly disposed with respect to said upper roll so that material being received therebetween is discharged in a rearwardly extending path from said rolls; and a transversely spaced pair of ground-engaging wheels connected to said frame means and operative to support said frame means relative to the ground, at least one of said wheels being disposed rearwardly of and within the transverse extent of said conditioning rolls, and having its upper side directly beneath the upwardly and rearwardly extending path of the crop discharged from the conditioner rolls and at approximately the same level as the upper side of the lower roll and its forward side closely adjacent but spaced from the rear side of the lower roll so that the forward side of the wheel is in generally the same vertical plane as the rear side of the lower roll.

13. A crop harvesting machine comprising: transversely extending frame means adapted to advance forwardly through a field; transversely extending cutting means mounted forwardly on said frame means and adapted to the cut a swath of crop material as said frame means is advanced forwardly; cooperating upper and lower parallel, transversely extending crop conditioning rolls mounted on said frame means above and rearwardly of said cutting means and in material-receiving relation to said cutting means so that material being received therebetween is discharged in a rearwardly directed path from said rolls; a transversely spaced pair of ground-engaging wheels connected to said frame means and operative to support said frame means relative to the ground, at least one of said wheels being disposed rearwardly of and within the transverse extent of said conditioning rolls, and having its upper side at approximately the same level as the upper side of the lower roll and its forward side closely adjacent but spaced from the rear side of the lower roll so that said path extends over but generally clear of said one wheel; a hood portion connected to the frame means and extending rearwardly therefrom in overlying relation to the path of crop material discharged from the conditioning rolls; and a pair of rearwardly converging side deflector members mounted on the hood in said discharge path, the forward end of one of said members being disposed behind and within the transverse extent of said one wheel so that the crop flows over at least a part of said wheel before it is converged by said side deflector member.

14. A crop harvesting machine comprising: transversely extending frame means adapted to advance forwardly through a field; transversely extending cutting means mounted forwardly on said frame means and adapted to cut a swath of crop material as said frame means is advanced forwardly; cooperating upper and lower parallel, transversely extending crop conditioning rolls mounted on said frame means above and rearwardly of said cutting means and in material-receiving relation to said cutting means so that material being received therebetween is discharged in a rearwardly directed air borne path from said rolls; and a right and left, transversely spaced pair of ground-engaging wheels connected to said frame means and operative to support said frame means relative to the ground, said wheels being disposed adjacent the respective ends of the rolls and rearwardly of and within the transverse extent of said rolls, and each wheel having its upper side beneath the rearward air borne path of material discharged from the rolls and its forward side closely adjacent but spaced from the rear side of the lower roll.

* * * * *